(12) United States Patent
Chavez et al.

(10) Patent No.: US 11,741,566 B2
(45) Date of Patent: Aug. 29, 2023

(54) MULTICAMERA IMAGE PROCESSING

(71) Applicant: Dexterity, Inc., Palo Alto, CA (US)

(72) Inventors: Kevin Jose Chavez, Woodside, CA (US); Yuan Gao, Mountain View, CA (US); Rohit Pidaparthi, Mountain View, CA (US); Talbot Morris-Downing, Menlo Park, CA (US); Harry Zhe Su, Union City, CA (US); Samir Menon, Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 195 days.

(21) Appl. No.: 16/667,661

(22) Filed: Oct. 29, 2019

(65) Prior Publication Data

US 2020/0273138 A1 Aug. 27, 2020

Related U.S. Application Data

(63) Continuation-in-part of application No. 16/380,859, filed on Apr. 10, 2019, now Pat. No. 10,549,928.
(Continued)

(51) Int. Cl.
*G06T 1/00* (2006.01)
*G06T 1/20* (2006.01)
(Continued)

(52) U.S. Cl.
CPC ............. *G06T 1/0014* (2013.01); *G06T 1/20* (2013.01); *G06T 7/174* (2017.01); *G06T 7/593* (2017.01);
(Continued)

(58) Field of Classification Search
CPC ........ B25J 19/023; G06T 1/0014; G06T 7/10; G06T 7/285; G06T 2207/10028; G06T 2207/20221
(Continued)

(56) References Cited

U.S. PATENT DOCUMENTS 5,501,571 A 3/1996 Van Durrett
5,908,283 A 6/1999 Huang
(Continued)

FOREIGN PATENT DOCUMENTS

CA 2357271 A1 9/2002
CN 107000208 A 8/2017
(Continued)

OTHER PUBLICATIONS

Chen et al. "Random Bin Picking with Multi-view Image Acquisition and CAD-Based Pose Estimation," 2018 IEEE International Conference on Systems, Man, and Cybernetics (SMC), USA, IEEE, Oct. 7, 2018, pp. 2218-2223 (Document disclosing the well-known art).
(Continued)

*Primary Examiner* — Timothy R Waggoner
(74) *Attorney, Agent, or Firm* — Van Pelt, Yi & James LLP

(57) ABSTRACT

A multicamera image processing system is disclosed. In various embodiments, image data is received from each of a plurality of sensors associated with a workspace, the image data comprising for each sensor in the plurality of sensors one or both of visual image information and depth information. Image data from the plurality of sensors is merged to generate a merged point cloud data. Segmentation is performed based on visual image data from at least a subset of the sensors in the plurality of sensors to generate a segmentation result. One or both of the merged point cloud data and
(Continued)

the segmentation result is/are used to generate a merged three dimensional and segmented view of the workspace.

21 Claims, 11 Drawing Sheets

Related U.S. Application Data

(60) Provisional application No. 62/809,389, filed on Feb. 22, 2019, provisional application No. 62/809,389, filed on Feb. 22, 2019.

(51) Int. Cl.
  *G06T 7/174* (2017.01)
  *G06T 7/593* (2017.01)
  *G06T 7/90* (2017.01)
  *H04N 13/204* (2018.01)

(52) U.S. Cl.
  CPC ...... *G06T 7/90* (2017.01); *G06T 2207/10024* (2013.01); *G06T 2207/10028* (2013.01); *G06T 2207/20221* (2013.01); *H04N 13/204* (2018.05)

(58) Field of Classification Search
  USPC .................................................. 700/217, 259
  See application file for complete search history.

(56) References Cited

U.S. PATENT DOCUMENTS

| | | | |
|---|---|---|---|
| 8,930,019 B2 * | 1/2015 | Allen | G05D 1/0248 700/245 |
| 9,089,969 B1 | 7/2015 | Theobald | |
| 9,315,344 B1 | 4/2016 | Lehmann | |
| 9,327,406 B1 | 5/2016 | Hinterstoisser | |
| 9,802,317 B1 * | 10/2017 | Watts | B25J 9/1687 |
| 9,811,892 B1 * | 11/2017 | Silverstein | G06T 5/20 |
| 10,124,489 B2 | 11/2018 | Chitta et al. | |
| 10,207,868 B1 | 2/2019 | Stubbs | |
| 10,549,928 B1 | 2/2020 | Chavez | |
| 10,906,188 B1 * | 2/2021 | Sun | B07C 5/36 |
| 2002/0106273 A1 | 8/2002 | Huang | |
| 2002/0164067 A1 * | 11/2002 | Askey | G06V 10/24 382/154 |
| 2007/0280812 A1 | 12/2007 | Morency | |
| 2009/0033655 A1 * | 2/2009 | Boca | B25J 9/1697 345/419 |
| 2010/0324729 A1 | 12/2010 | Ruge | |
| 2012/0259582 A1 * | 10/2012 | Gloger | B25J 11/00 702/173 |
| 2013/0315479 A1 * | 11/2013 | Paris | G06K 9/6256 382/159 |
| 2015/0035272 A1 | 2/2015 | Johnson | |
| 2015/0352721 A1 * | 12/2015 | Wicks | B25J 9/1687 700/228 |
| 2016/0016311 A1 | 1/2016 | Konolige | |
| 2016/0075031 A1 | 3/2016 | Gotou | |
| 2016/0207195 A1 | 7/2016 | Eto | |
| 2016/0229061 A1 | 8/2016 | Takizawa | |
| 2016/0272354 A1 | 9/2016 | Nammoto | |
| 2017/0246744 A1 | 8/2017 | Chitta | |
| 2017/0267467 A1 | 9/2017 | Kimoto | |
| 2018/0086572 A1 | 3/2018 | Kimoto | |
| 2018/0144458 A1 | 5/2018 | Xu | |
| 2018/0162660 A1 | 6/2018 | Saylor | |
| 2018/0308254 A1 | 10/2018 | Fu | |
| 2019/0000564 A1 | 1/2019 | Navab | |
| 2019/0016543 A1 * | 1/2019 | Turpin | B25J 19/023 |
| 2019/0102965 A1 * | 4/2019 | Greyshock | G07F 11/60 |
| 2019/0362178 A1 * | 11/2019 | Huang | G06V 10/42 |
| 2020/0117212 A1 * | 4/2020 | Tian | B25J 13/085 |
| 2020/0130961 A1 * | 4/2020 | Diankov | G06T 7/001 |

FOREIGN PATENT DOCUMENTS

| | | |
|---|---|---|
| CN | 107088877 A | 8/2017 |
| CN | 108972564 A | 12/2018 |
| CN | 109255813 | 3/2021 |
| EP | 1489025 | 12/2004 |
| EP | 3349182 | 7/2018 |
| JP | 2001184500 | 7/2001 |
| JP | 2006302195 | 11/2006 |
| JP | 5905549 | 4/2016 |
| WO | 9823511 | 6/1998 |
| WO | 2017195801 | 11/2017 |
| WO | 20180130491 | 7/2018 |
| WO | 2020017185 | 1/2020 |

OTHER PUBLICATIONS

Kato et al. "Extraction of Reference Point Candidates from Three-Dimensional Point Group and Learning of Relative Position Concepts," The 23rd Symposium on Sensing via Image Information SSII2017, Japan, SSII, Jun. 7, 2017, pp. 1-6 (Document disclosing the well-known art) (Note) Part or all of the presented non-patent documents may not be sent due to limitation by law or contract.

Gratal et al: "Scene Representation and Object Grasping Using Active Vision", https://batavia.internal.epo.org/digital-file-repository/digital-file-repository-fro ntend-prod/dossier/ep1991600I?TOC=L0gggv0b BHD69LV, Jan. 1, 2010 (Jan. 1, 2010), XP055572509.

Ji et al: "Autonomous 3D scene understanding and exploration in cluttered workspaces using point cloud data", 2018 IEEE 15th International Conference on Networking, Sensing and Control (ICNSC), IEEE, Mar. 27, 2018 (Mar. 27, 2018), pp. 1-6, XP033340626, DOI: 10.1109/ICNSC.2018.8361275 [retrieved on May 18, 2018].

Kakiuchi et al: "Creating household environment map for environment manipulation using color range sensors on environment and robot", Robotics and Automation (ICRA), 2011 IEEE International Conference on, IEEE, May 9, 2011 (May 9, 2011), pp. 305-310, XP032034341, DOI: 10.1109/ICRA.2011.5980522. ISBN: 978-1-61284-386-5.

Nishida et al., "Object Classification Considering Movability Based on Shape Features with Parts Decomposition," Transactions of the Society of Instrument and Control Engineers, Japan, The Society of Instrument and Control Engineers, May 31, 2015, vol. 51, No. 5, pp. 319-328.

Takeguchi et al., "Robust Object Recognition through Depth Aspect Image by Regular Voxels," The IEICE Transactions on Information and Systems, Japan, The Institute of Electronics, Information and Communication Engineers, Sep. 1, 2003, vol. J86-D-II, No. 9, pp. 1308-1319.

* cited by examiner

MULTICAMERA IMAGE PROCESSING

CROSS REFERENCE TO OTHER APPLICATIONS

This application claims priority to U.S. Provisional Patent Application No. 62/809,389 entitled ROBOTIC MULTI-ITEM TYPE PALLETIZING & DEPALLETIZING filed Feb. 22, 2019, which is incorporated herein by reference for all purposes.

This application is a continuation in part of co-pending U.S. patent application Ser. No. 16/380,859 entitled ROBOTIC MULTI-ITEM TYPE PALLETIZING & DEPALLETIZING filed Apr. 10, 2019, which is incorporated herein by reference for all purposes, which claims priority to U.S. Provisional Patent Application No. 62/809,389 entitled ROBOTIC MULTI-ITEM TYPE PALLETIZING & DEPALLETIZING filed Feb. 22, 2019, which is incorporated herein by reference for all purposes.

BACKGROUND OF THE INVENTION

Robots are used in many environments to pick, move, manipulate, and place items, for example. To perform tasks in a physical environment, sometimes referred to herein as a "workspace" a robotics system typically uses cameras and other sensors to detect objects to be operated on by the robotic system, such as items to be picked and placed using a robotic arm, and to generate and execute plans to operate on the objects, e.g., to grasp one or more objects in the environment and move such object(s) to a new location within the workspace.

The sensors may include a plurality of cameras, one or more of which may be three dimensional ("3D") cameras, which generate traditional (e.g., red-blue-green or "RBG") image data and also "depth pixels" indicating a distance to points in the image. However, a single camera may not be able to generate image data and/or full 3D image data for all objects in a workspace, due to objects or portions thereof being obscured, etc. To operate successfully, a robotics system must be able to respond to changing conditions and must be able to plan and execute operations within an operationally meaningful timeframe.

BRIEF DESCRIPTION OF THE DRAWINGS

Various embodiments of the invention are disclosed in the following detailed description and the accompanying drawings.

DETAILED DESCRIPTION

Figure 1:
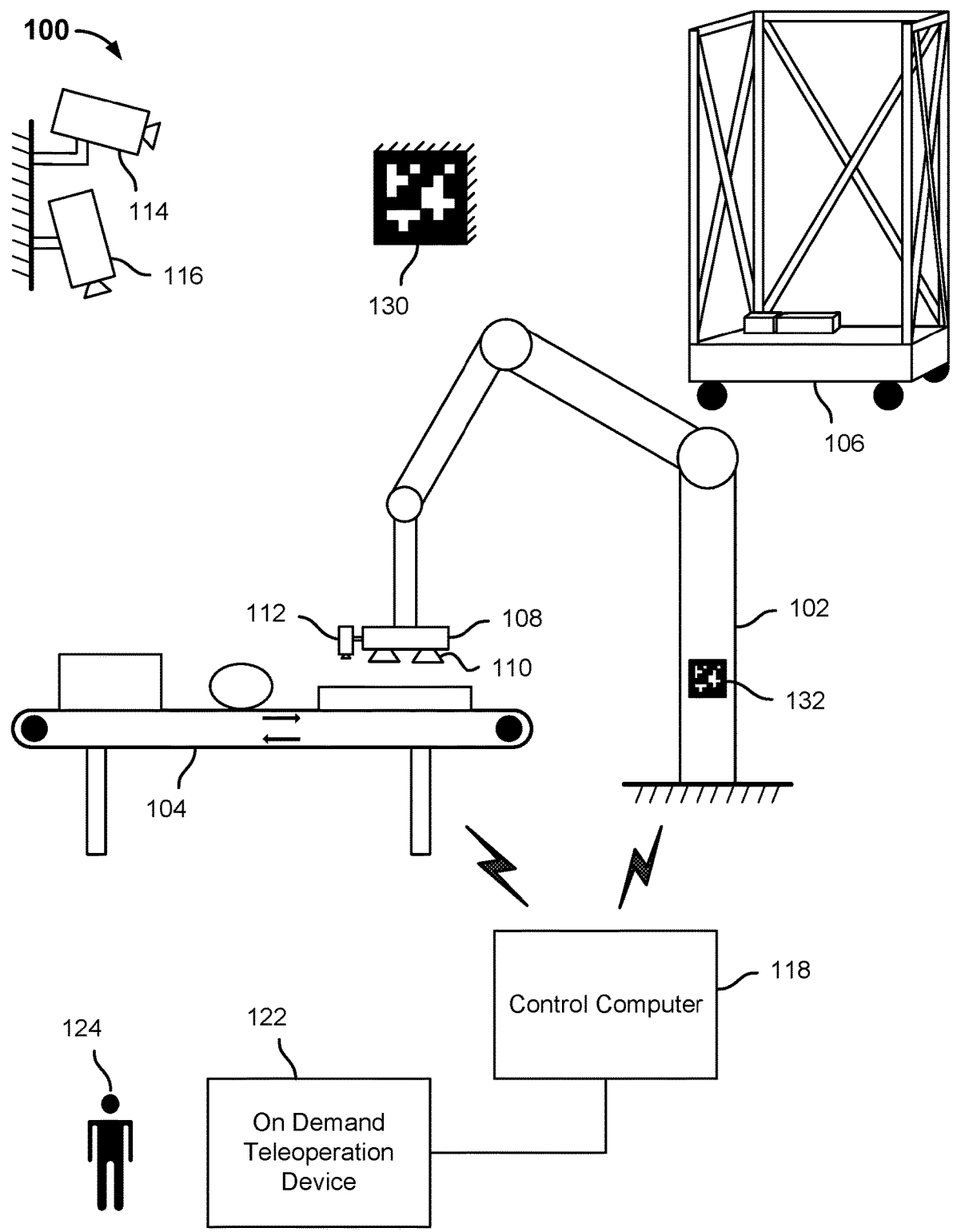
FIG. 1 is a diagram illustrating an embodiment of a robotic system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to use a set of sensors including a plurality of cameras or other image sensors to generate a three dimensional view of a workspace. In some embodiments, the three dimensional view is employed to programmatically use a robotic system comprising one or more robots (e.g., robotic arm with suction, gripper, and/or other end effector at operative end) to perform work in the workspace, e.g., to palletize/depalletize and/or to otherwise pack and/or unpack arbitrary sets of non-homogeneous items (e.g., dissimilar size, shape, weight, weight distribution, rigidity, fragility, etc.

In various embodiments, 3D cameras, force sensors, and other sensors are used to detect and determine attributes of items to be picked and/or placed and/or to generate programmatically a plan to grasp one or more items at an initial location and move the one or more items each to a corresponding destination location within the workspace. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used.

In some embodiments, techniques disclosed herein may be used to generate and display a visual representation of at least a portion of the workspace. In various embodiments, the visual representation may be displayed via a computer or other display device comprising a workstation used by a human operator to monitor a robot operating in a fully or partially automated mode and/or to control a robotic arm or other robotic actuator via teleoperation.

For example, in some embodiments, human intervention may be invoked if the robotic system gets stuck, e.g., cannot within configured parameters (e.g., time out, confidence score, etc.) perform or complete a next task or operation. In some embodiments, a displayed image and/or video of the workspace may be used to perform teleoperation. The human operator may control the robot manually, using the displayed image or video to view the workspace and control the robot. In some embodiments, the display may be incorporated into an interactive, partly automated system. For example, a human operator may via the display indicate a point in the displayed image of the scene at which the robot should grasp an object.

FIG. 1 is a diagram illustrating an embodiment of a robotic system. In the example shown, the robotic system 100 comprises robotic arm 102 and is configured to palletize and/or depalletize heterogeneous items. In this example the robotic arm 102 is stationary, but in various alternative embodiments robotic arm 102 may be a fully or partly mobile, e.g., mounted on a rail, fully mobile on a motorized chassis, etc. As shown, robotic arm 102 is used to pick arbitrary and/or dissimilar items from a conveyor belt (or other source) 104 and stack them on a pallet or other receptacle 106. In the example shown, receptacle 106 comprise a pallet or base with wheels at the four corners and at least partially closed on three of four sides, sometimes referred to as a three-sided "roll pallet", "roll cage", and/or "roll" or "cage" "trolley". In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In the example shown, robotic arm 102 is equipped with a suction-type end effector 108. End effector 108 has a plurality of suction cups 110. Robotic arm 102 is used to position the suction cups 110 of end effector 108 over an item to be picked up, as shown, and a vacuum source provides suction to grasp the item, lift it from conveyor 104, and place it at a destination location on receptacle 106.

In various embodiments, one or more of camera 112 mounted on end effector 108 and cameras 114, 116 mounted in a space in which robotic system 100 is deployed are used to generate image data used to identify items on conveyor 104 and/or determine a plan to grasp, pick/place, and stack the items on receptacle 106. In various embodiments, additional sensors not shown, e.g., weight or force sensors embodied in and/or adjacent to conveyor 104 and/or robotic arm 102, force sensors in the x-y plane and/or z-direction (vertical direction) of suction cups 110, etc. may be used to identify, determine attributes of, grasp, pick up, move through a determined trajectory, and/or place in a destination location on or in receptacle 106 items on conveyor 104 and/or other sources and/or staging areas in which items may be located and/or relocated, e.g., by system 100.

In the example shown, camera 112 is mounted on the side of the body of end effector 108, but in some embodiments camera 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

Referring further to FIG. 1, in the example shown system 100 includes a control computer 118 configured to communicate, in this example via wireless communication (but in one or both of wired and wireless communication in various embodiments) with elements such as robotic arm 102, conveyor 104, effector 108, and sensors, such as camera 112, 114, and 116 and/or weight, force, and/or other sensors not shown in FIG. 1. In various embodiments, control computer 118 is configured to use input from sensors, such as camera 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model are used to determine a strategy to grasp, move, and place an item in a destination location, e.g., a determined location at which the item is determined to be placed as part of a planning/re-planning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

In various embodiments, control computer 118 is configured to receive and process image data (e.g., two-dimensional RGB or other image data, successive frames comprising video data, point cloud data generated by 3D sensors, successive sets of point cloud data each associated with a corresponding frame of 2D image data, etc.). In some embodiments, control computer 118 receives aggregated and/or merged image data that has been generated by a separate computer, application, service, etc. based on image data generated by and received from cameras 112, 114, and 116 and/or other sensors, such as laser sensors, and other light, thermal, radar, sonar, or other sensors that use projected, reflected, radiated and/or otherwise received electromagnetic radiation and/or signals to detect and/or convey information used or usable to make an image. An image as used herein includes a visually and/or computer or other machine perceptible representation, depiction, etc. of objects and/or features present in a physical space or scene, such as a workspace in which the robotic system 100 is located in the example shown in FIG. 1.

In various embodiments, image data generated and provided by cameras 112, 114, and/or 116 and/or other sensors is processed and used to generate a three dimensional view of at least a portion of the workspace in which the robotic system 100 is located. In some embodiments, image data from multiple cameras (e.g., 112, 114, 116) is merged to generate a three dimensional view of the workspace. The merged imaged data is segmented to determine the boundaries of objects of interest in the workspace. The segmented image data is used to perform tasks, such as to determine through automated processing a strategy or plan to do one or more of grasp an object in the workspace, move the object through the workspace, and place the object in a destination location.

In various embodiments, 3D point cloud data views generated by multiple cameras (e.g., cameras 112, 114, 116) is merge into a complete model or view of the workspace via a process known as registration. The respective positions and orientations of objects and features of the workspace as captured in the separately acquired views are translated to a global three dimensional coordinate framework, such that the intersecting areas between them overlap as perfectly as possible. For every set of point cloud datasets acquired from different cameras or other sensors (i.e., different views), in various embodiments the system aligns them together into a single point cloud model as disclosed herein, so that subsequent processing steps such as segmentation and object reconstruction can be applied.

In various embodiments, a three dimensional view of the workspace is generated using image data generated and provided by cameras 112, 114, and/or 116 at least in part by cross-calibrating the cameras, e.g., cameras 112, 114, and 116, and merging data to generate a view of the workspace and items/objects present in the workspace from as many angles and views as are available. For example, in the example shown in FIG. 1, cameras 112 and 116 may be in a position to view objects on conveyor 104, while camera 114, shown pointed at receptacle 106 in the example shown, may not (currently) have any image data from the part of the workspace in which conveyor 104 is located. Likewise, the arm 102 may be moved into a position such that camera 112 no longer has a view of the conveyor 104. In various embodiments, image data (e.g., RGB pixels, depth pixels, etc.) from cameras in the workspace are merged to dynamically generate and continuous update a three dimensional view of the workspace that is as complete and accurate as possible given the image data being received from the cameras and/or other sensors at any given moment of time. If a camera has its view of an object or area in the workspace blocked, or the camera is moved or pointed in a different direction, image data from those cameras that continue to have a line of sight to the affected object or area will continue to be used to generate as complete and accurate a view as possible of the object or area.

In various embodiments, techniques disclosed herein enable multiple image data from cameras to be used to generate and maintain a more complete view of a workspace and objects in the workspace. For example, using multiple cameras in different locations and/or orientations in the workspace a smaller object that may be obscured by a larger object from one perspective may be visible via image data one or more cameras positioned to view the object from a vantage point from which the smaller object is not obscured. Similarly, an object may be viewed from many angles, enabling all unobscured sides and features of the object to be discerned, facilitating such operations as determining and implementing a grasp strategy, determining to place an item snugly adjacent to the object, maintaining a view of the object as a human worker or robotic actuator (e.g., robotic arm, conveyor, robotically controlled movable shelf, etc.) moves through the workspace, etc.

In some embodiments, segmented image (e.g., video) data is used to generate and display a visualization of the workspace. In some embodiments, objects of interest may be highlighted in the displayed visualization. For example, a colored bounding shape or outline may be displayed. In some embodiments, a human-operable interface is provided to enable a human operator to correct, refine, or otherwise provide feedback regarding automatically-generated boundaries of an object of interest. For example, an interface may be provided to enable a user to move or adjust the location of an automatically generated bounding shape or outline, or to indicate that a highlighted region actually includes two (or more) objects, and not one. In some embodiments, the displayed visualization may be used to enable a human operator to control a robot in the workspace in a teleoperation mode. For example, a human operator may use the segmented video to move the robotic arm (or other actuator) into position, grasp a highlighted object (e.g., from conveyor 104), and move the highlighted object to a destination location (e.g., on receptacle 106).

In various embodiments, to enable image data from multiple cameras to be merged to perform tasks as disclosed herein, at least a master or calibration reference camera is calibrated with respect to a calibration pattern, object, or other reference having a stationary and/or otherwise known location, orientation, etc. In the example shown in FIG. 1, for example, one or more of cameras 112, 114, and 116 may be calibrated based on one or more images of marker 130 mounted in a static location (e.g., on a wall at a known location) in the workspace and/or marker 132 mounted (printed, etc.) on robotic arm 102. In various embodiments, images generated by the calibrated master camera are used to cross-calibrate one or more of the other cameras in the workspace.

In some embodiments, processing is performed to detect a need to re-calibrate and/or cross-calibrate cameras, e.g., due to camera error, a camera being bumped or intentionally repositioned or reoriented; an operation attempted based on image data failing in a manner indicative of camera error or misalignment; the system detecting based on image data from one camera that the position, orientation, etc. of another camera is other than as expected; etc. In various embodiments, the system 100 (e.g., control computer 118) is configured to detect automatically a need to recalibrate one or more cameras and to recalibrate, automatically and dynamically, as disclosed herein. For example, recalibration in various embodiments is performed by one or more of using a camera mounted on a robotic actuator (e.g., camera 112) to relocate a fiducial marker in the workspace (e.g., marker 130); re-estimating camera-to-workspace transformation using fiducial markers; and recalibrating to a marker on the robot (e.g., marker 132).

Figure 2:
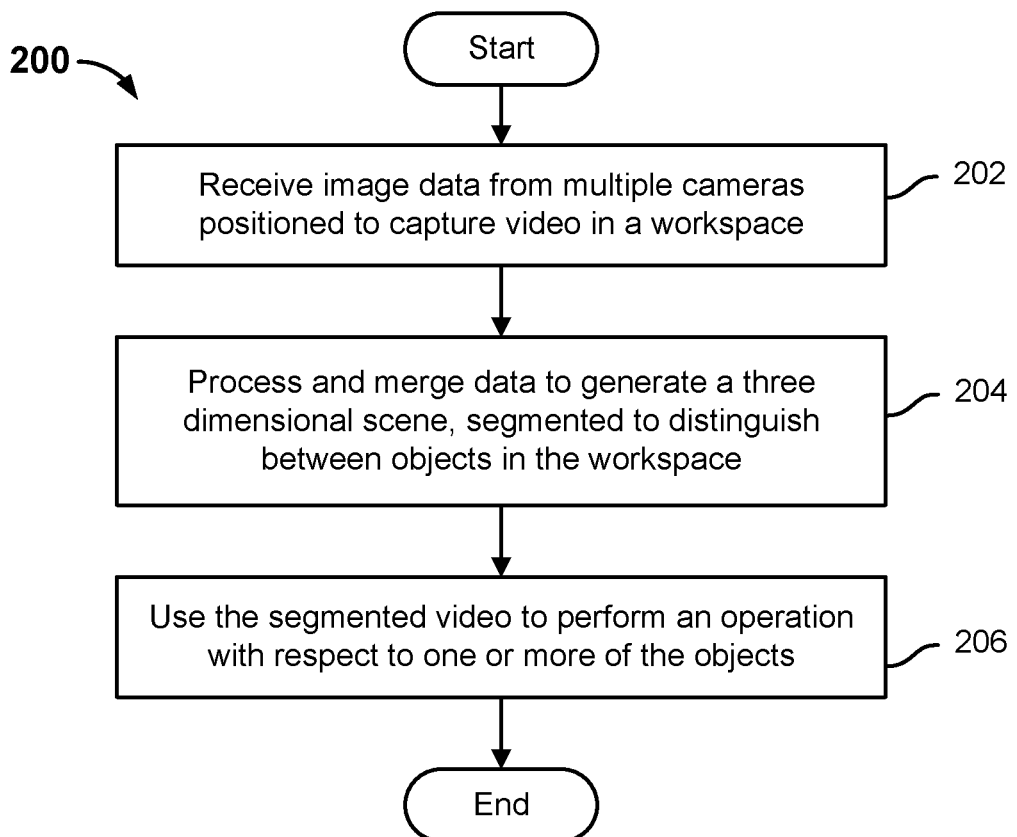
FIG. 2 is a flow chart illustrating an embodiment of a process to use image data from multiple cameras to perform a robotic operation.

FIG. 2 is a flow chart illustrating an embodiment of a process to use image data from multiple cameras to perform a robotic operation. In various embodiments, the process 200 of FIG. 2 is performed by a computer or other processor, such as control computer 118 of FIG. 1. In the example shown, image data is received from multiple cameras positioned to capture video, e.g., 3D video comprising RGB and depth pixels, in a workspace (202). The received image data is processed and merged to generate a three dimensional view of the workspace (also referred to as a "scene"), segmented to distinguish between objects in the workspace (204). The segmented video is used to perform an operation with respect to one or more of the objects (206), e.g., to grasp and move the object to a new location in the workspace.

Figure 3:
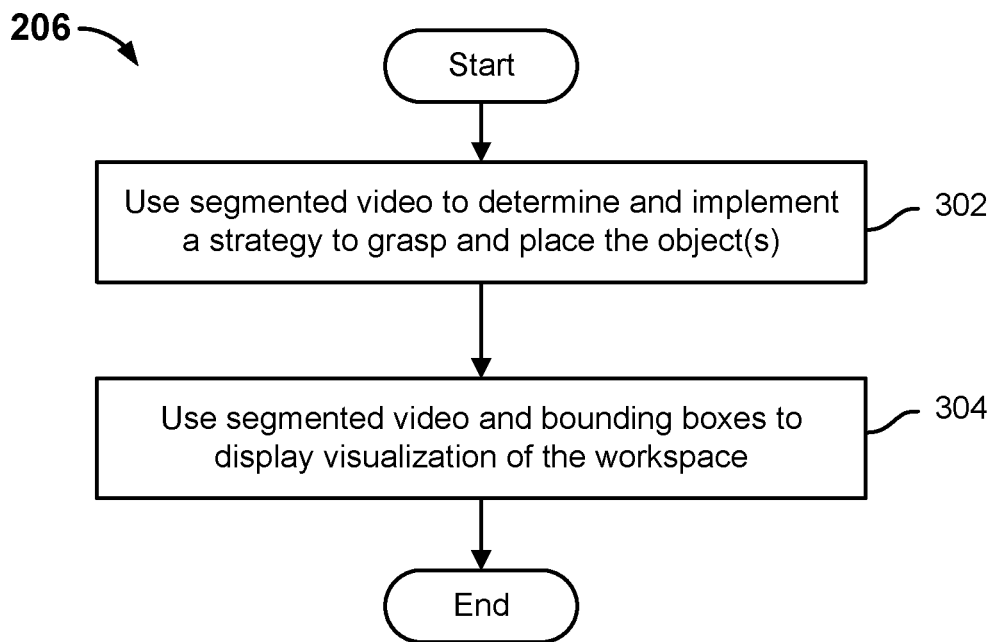
FIG. 3 is a flow chart illustrating an embodiment of a process to use segmented image data to perform a robotic operation.

FIG. 3 is a flow chart illustrating an embodiment of a process to use segmented image data to perform a robotic operation. In various embodiments, the process of FIG. 3 is used to implement step 206 of the process of FIG. 2. In the example shown, segmented video data is used to determine and implement a strategy to grasp, move, and place one or more objects (302). The segmented video and associated bounding boxes (or other shapes) are used to generate and display a visualization of the workspace (304). For example, the segmentation data is used in some embodiments to generate one or more mask layers to superimpose on each of at least a subset of objects in the workspace a semi-transparent, colored shape conforming (as near as possible) to the outline of the object.

In various embodiments, the visualization may be used by a human operator to monitor operation of the robotic system in an autonomous mode and/or to operate a robotic arm or other robotic actuator by teleoperation.

Figure 4:
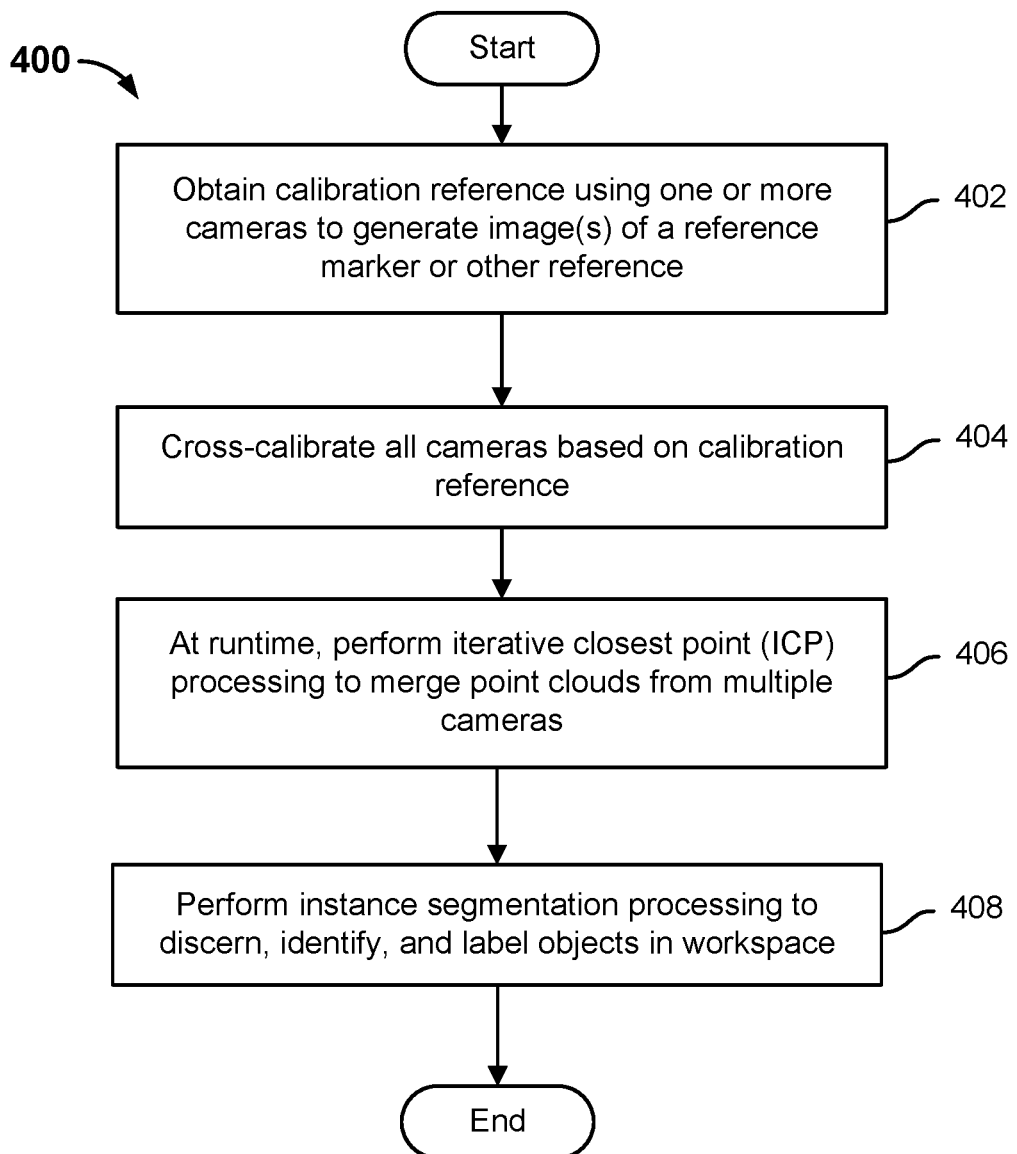
FIG. 4 is a flow chart illustrating an embodiment of a process to calibrate multiple cameras deployed in a workspace.

FIG. 4 is a flow chart illustrating an embodiment of a process to calibrate multiple cameras deployed in a workspace. In various embodiments, the process 400 of FIG. 4 is performed by a computer, such as control computer 118 of FIG. 1, configured to control and process data received from a plurality of cameras or other sensors in a workspace, such as cameras 112, 114, and 116 of FIG. 1. In the example shown, a calibration reference is obtained by using one or more cameras to generate images of a reference marker or other reference in the workspace (402). For example, in the example shown in FIG. 1, one or more of cameras 112, 114, and 116 may be used to generate one or more images of marker 130 and/or marker 132. In some embodiments, a robotic arm or other actuator may be moved into a known, fixed position, such as by inserting a key or other item or appendage into a corresponding hole or other receiver, and generating an image while in the known position and orientation.

Referring further to FIG. 4, the calibration reference is used to cross-calibrate all cameras in the workspace (404). At runtime, iterative closest point (ICP) processing is performed to merge point clouds from multiple cameras (406). Instance segmentation processing is performed to discern, identify (e.g., by type, etc.), and label objects in the workspace (408).

Figure 5:
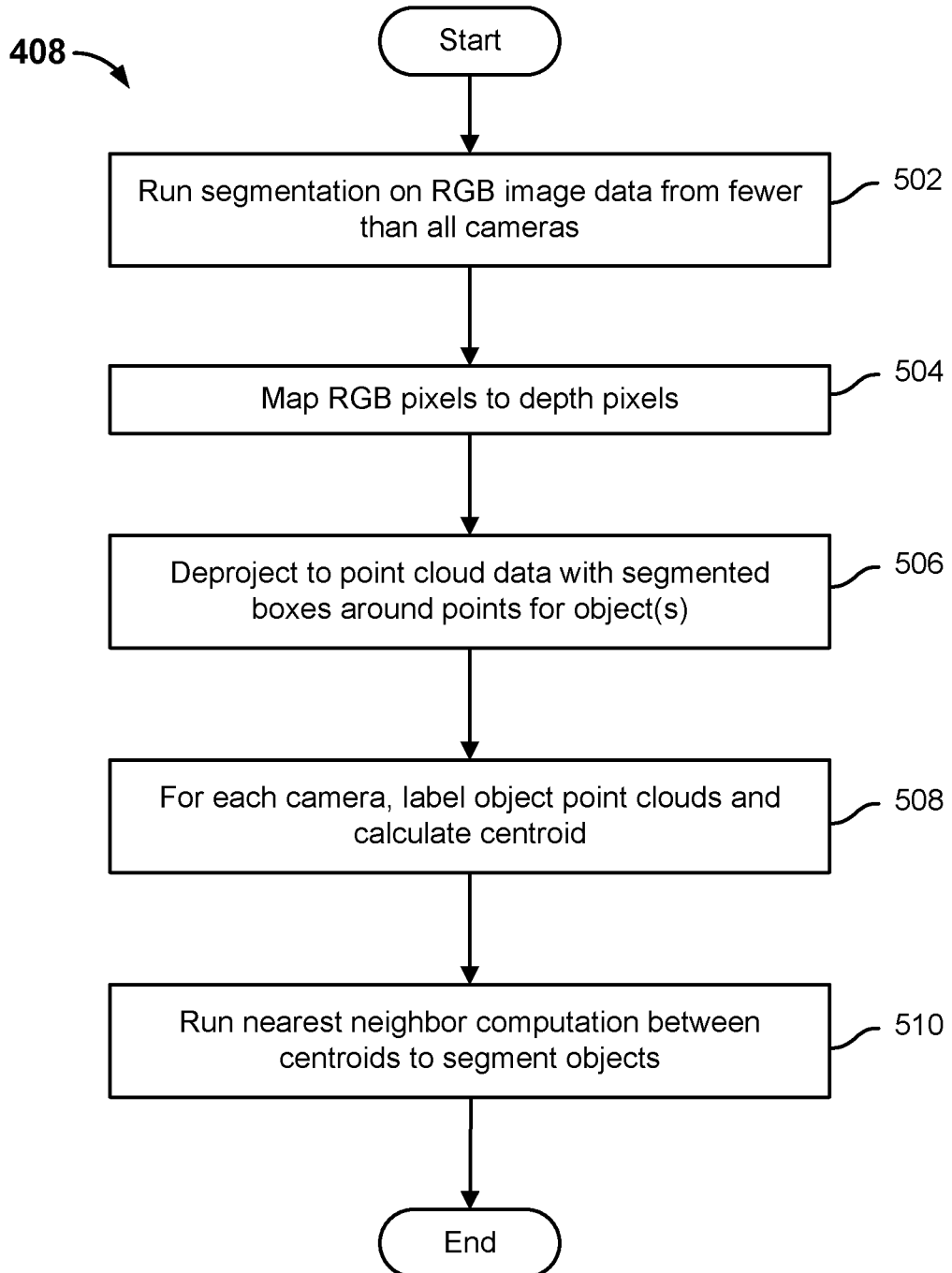
FIG. 5 is a flow chart illustrating an embodiment of a process to perform object instance segmentation processing on image data from a workspace.

FIG. 5 is a flow chart illustrating an embodiment of a process to perform object instance segmentation processing on image data from a workspace. In various embodiments, the process of FIG. 5 is used to implement step 408 of the process of FIG. 4. In the example shown, segmentation processing is performed on RGB (2D) image data from fewer than all cameras in the workspace (502). In some embodiments, segmentation is performed using RGB data from one camera. The RGB pixels identified in the segmentation processing as being associated with object boundaries are mapped to corresponding depth pixels (504). The segmentation data and mapped depth pixel information is used to de-project to a point cloud with segmented boxes (or other shapes) around points for objects (506). For each camera's image data, the point cloud for each object is labeled and a centroid is calculated (508). Nearest neighbor computations are run between the centroids of corresponding object point clouds of the respective cameras to segment objects (510).

Figure 6:
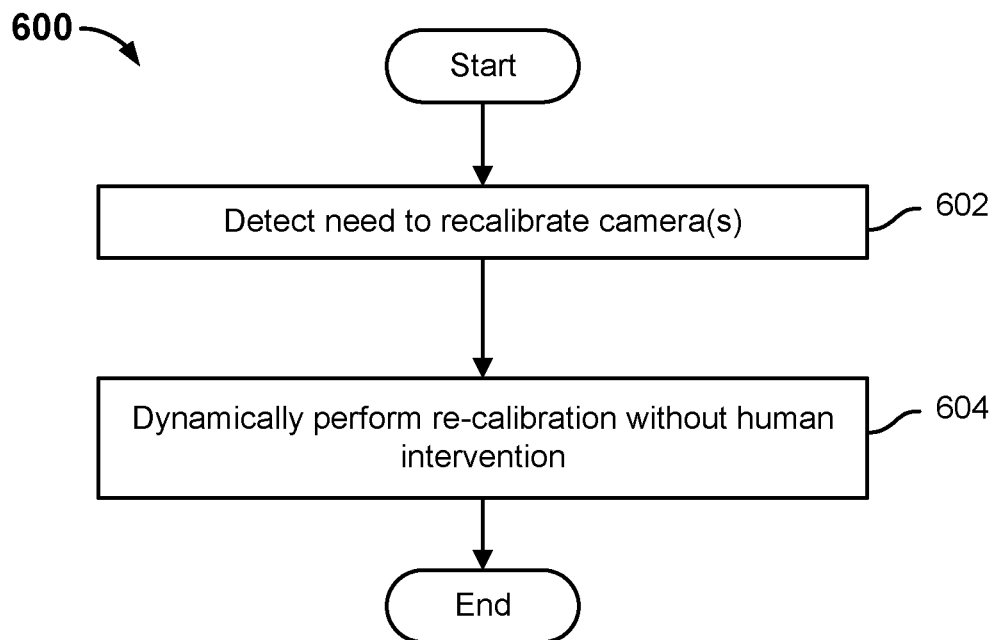
FIG. 6 is a flow chart illustrating an embodiment of a process to maintain calibration of cameras in a workspace.

FIG. 6 is a flow chart illustrating an embodiment of a process to maintain calibration of cameras in a workspace. In various embodiments, the process 600 of FIG. 6 is performed by a computer or other processor, such as control computer 118 of FIG. 1. In the example shown, a need to recalibrate one or more cameras in a workspace is detected (602). In various embodiments, one or more of the following may indicate a need to re-calibrate: a camera sees that the robot base position has moved (e.g., based on an image of an aruco or other marker on the base); a camera on a robotic arm or other actuator sees that a camera mounted in the workspace has moved (e.g., been bumped, intentionally repositioned by a human or robotic worker, etc.); and the system detects several (or greater than a threshold number) of missed grabs in a row. Recalibration is performed dynamically, e.g., in real time without aborting the pick-and-place or other robotic operation, without human intervention (604). In various embodiments, recalibration may include one or more of the following: using a camera mounted on a robotic actuator (e.g., camera 112) to relocate a fiducial marker in the workspace (e.g., marker 130); re-estimating camera-to-workspace transformation using fiducial markers; and recalibrating to a marker on the robot (e.g., marker 132).

Figure 7:
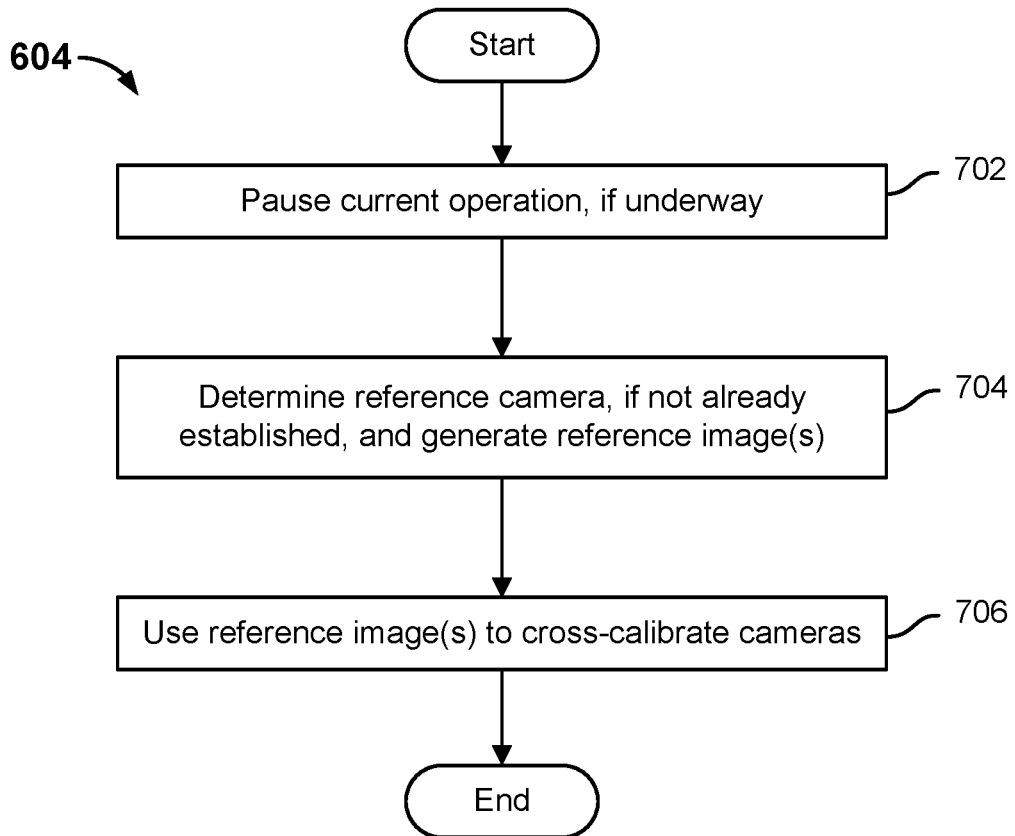
FIG. 7 is a flow chart illustrating an embodiment of a process to re-calibrate cameras in a workspace.

FIG. 7 is a flow chart illustrating an embodiment of a process to re-calibrate cameras in a workspace. In various embodiments, the process of FIG. 7 is used to implement step 604 of the process of FIG. 6. In the example shown, a robotic system operation—such as an operation to pick and place a prescribed set of items to a desired destination or set of destinations, such as a pallet or other receptacle, as in the example shown in FIG. 1—is paused (702). A reference camera is determined, if not already designated or otherwise established, a one or more reference images are generated (704). For example, a stationary camera, a camera mounted on a robotic arm, etc., may be designated as the reference camera. Or, a camera included in a set that appears to remain in sync with one or more other cameras may be selected as the reference camera to which to recalibrate the others, etc. The reference images may include images by the reference camera and one or more other cameras of a fiducial marker or other reference in the workspace. The reference images are used to cross-calibrate the cameras (706).

Figure 8:
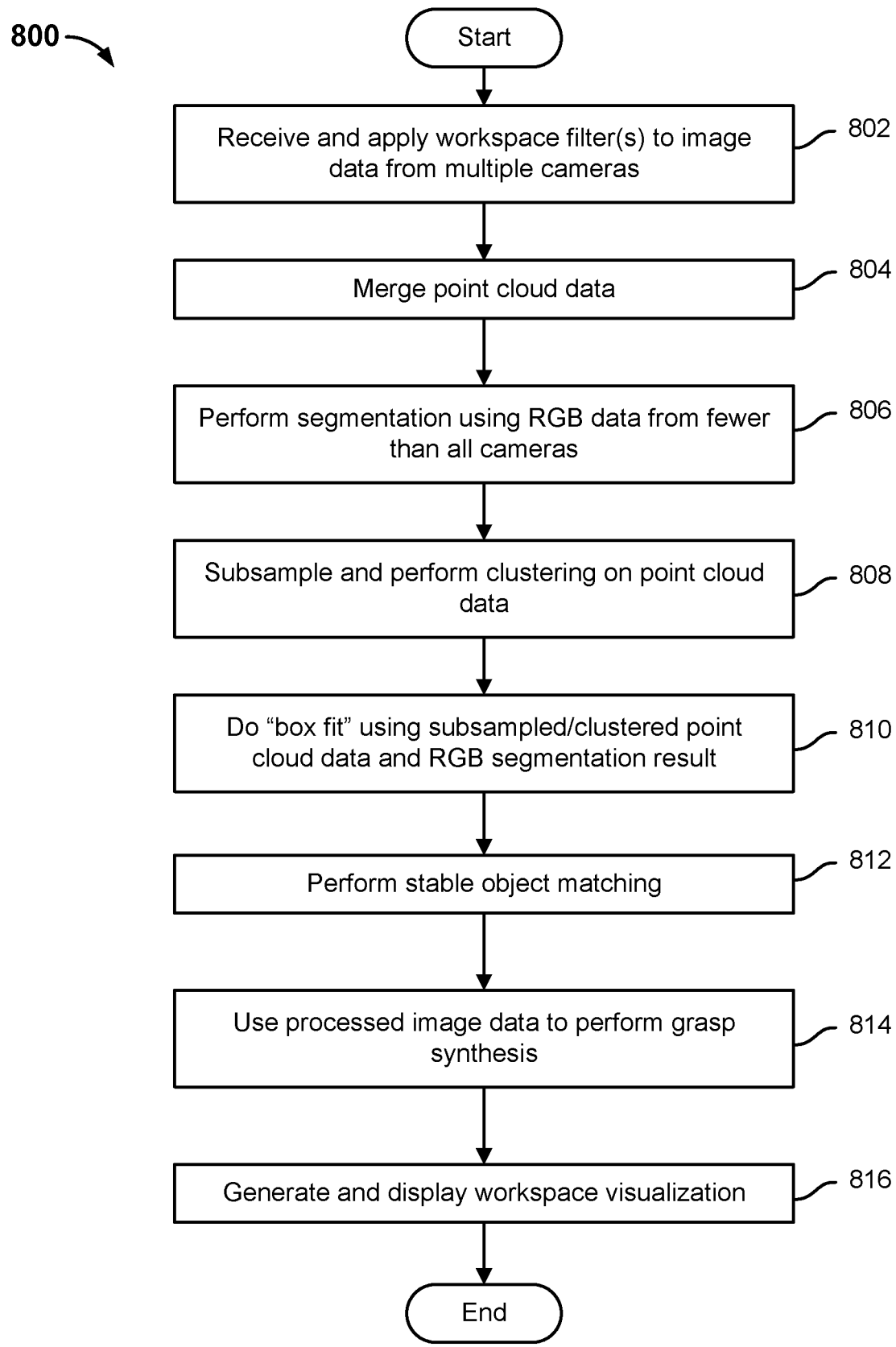
FIG. 8 is a flow chart illustrating an embodiment of a process to use image data from multiple cameras to perform a robotic operation in and/or provide a visualization of a workspace.

FIG. 8 is a flow chart illustrating an embodiment of a process to use image data from multiple cameras to perform a robotic operation in and/or provide a visualization of a workspace. In various embodiments, the process 800 of FIG. 8 is performed by a computer or other processor, such as control computer 118 of FIG. 1. In the example shown, image data is received from multiple cameras in a workspace and workspace filters are applied (802). In various embodiments, workspace filters may remove image and/or point cloud data associated with portions of the workspace, features of the workspaces, items in the workspace, etc., that can be ignored for purposes of the robotic operation the image/sensor data is being used to perform. Filtering out extraneous information enables a more clear and/or focused view of the elements to be operated on and/or with respect to in the workspace, such as objects to be grasped and placed, pallets or other destinations from or to which items are to be grasped or placed, obstacles that may be encountered in the course of moving an item to a destination, etc.

In some embodiments, statistical outlier data may be removed by workspace filters, to clean up noise from the sensor. Point cloud data from the respective cameras is merged (804). Segmentation is performed using RGB image data from one or more of the cameras (806). For example, initially RGB segmentation may be performed on image data from only one camera. Point cloud data is subsampled and clustering is performed (808). "Box (or other 3D geometric primitive) fit" processing is performed using the subsampled and clustered point cloud data and the RGB segmentation result data (810). Stable object matching is performed (812). In various embodiments, multiple 3D representations of the same object can arise from using 2D methods from different cameras. These representations may only partially overlap. In various embodiments, "stable object matching" includes reconciling which segments correspond to the same object and merging the representations. In various embodiments, spatial, geometric, curvature properties, or features of the point cloud (including RGB data with each point) may be used to perform stable object matching. In some embodiments, stable object matching may be performed over time, across multiple frames from the same camera instead of two different cameras, etc. The processed image data is used to perform grasp synthesis (814). For example, object location and boundary information may be used to determine a strategy to use a robotic gripper or other end effector to grasp the object. The processed image data is used to generate and display a visualization of the workspace (816). For example, raw video of the workspace may be displayed with color or other highlighting applied to bounding boxes (or other geometric primitives) associated with different objects in the workspace.

Techniques are disclosed to configure a robotic system to process and merge sensor data from multiple sensors, such as multiple 3D cameras, to perform a robotic operation. In various embodiments, an administrative user interface, configuration file, application programming interface (API), or other interface may be used to identify sensors and define one or more processing pipelines to process and use sensor output to perform robotic operations. In various embodiments, pipelines may be defined by identifying processing modules and how the respective inputs and outputs of such modules should be linked to form a processing pipeline. In some embodiments, the definition is used to generate binary code to receive, process, and use sensor inputs to perform robotic operations. In other embodiments, the definition is used by a single, generic binary code that dynamically loads plugins to perform the processing.

Figure 9A:
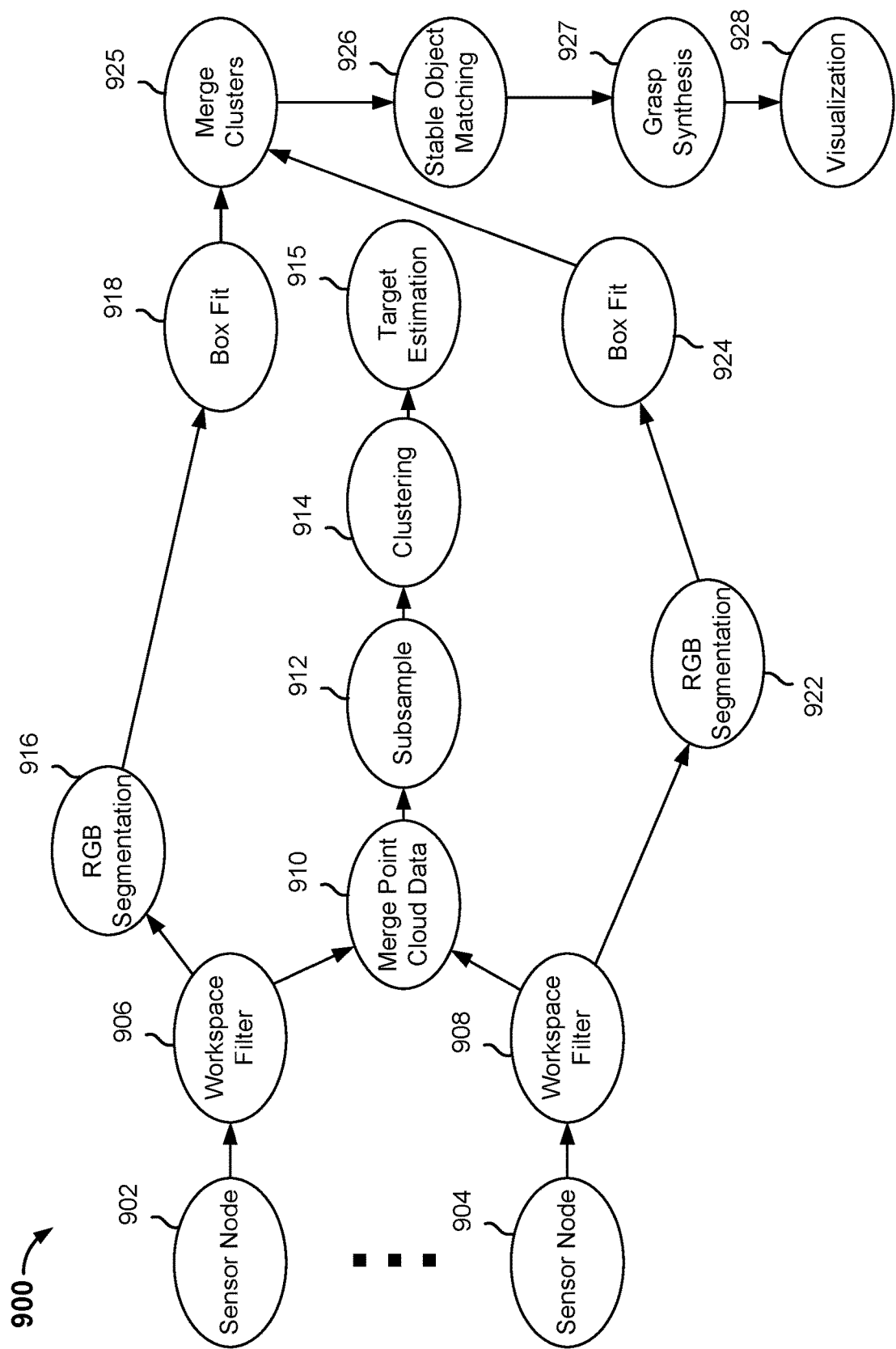
FIG. 9A is a diagram illustrating an embodiment of a multi-camera image processing system for robotic control.
Figure 9B:
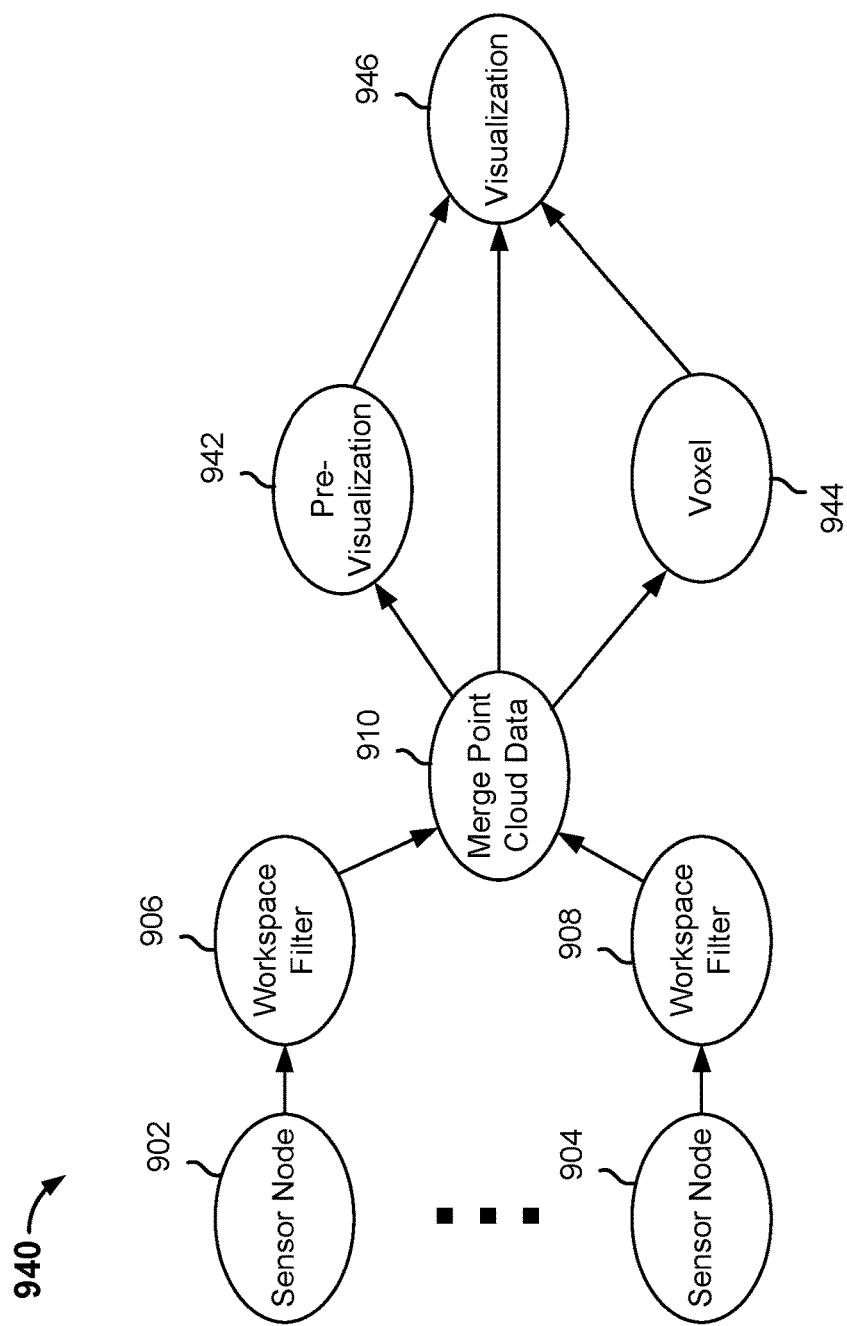
FIG. 9B is a diagram illustrating an embodiment of a multi-camera image processing system for robotic control.
Figure 9C:
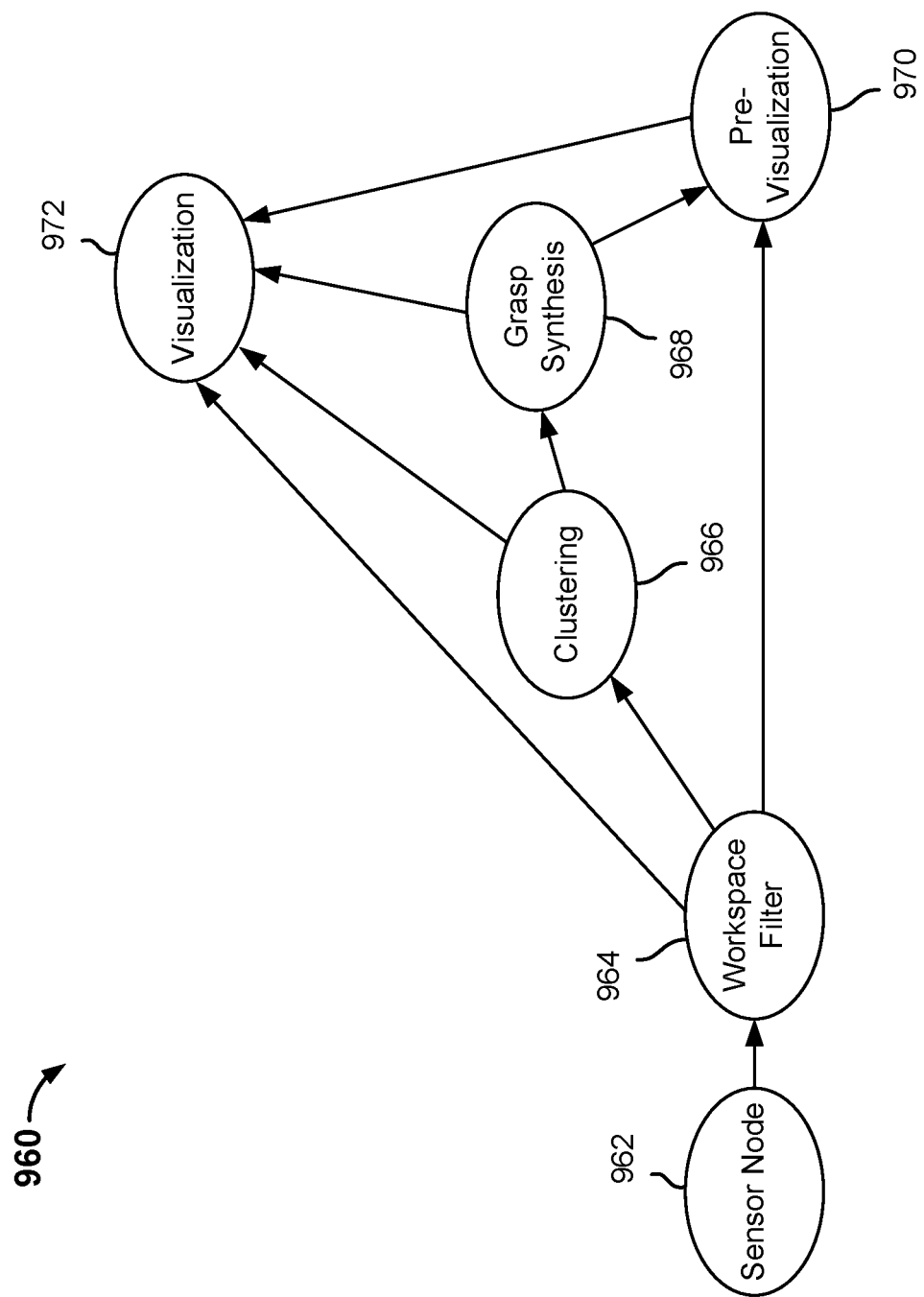
FIG. 9C is a diagram illustrating an embodiment of a multi-camera image processing system for robotic control.

FIGS. 9A, 9B, and 9C, respectively, show examples of pipelines configured and implemented using techniques disclosed herein, in various embodiments.

FIG. 9A is a diagram illustrating an embodiment of a multi-camera image processing system for robotic control. In the example shown, the system 900 includes a plurality of sensors, such as 3D or other cameras, represented in FIG. 9A by sensor nodes 902 and 904. The sensor output of nodes 902 and 904, respectively, are processed by workspace filters 906 and 908. The resulting point cloud data (3D part of the filtered sensor output) is merged 910. The merged point cloud data 910 is subsampled 912 and clustered 914, and in this example the resulting object cluster data is used by a "target estimation" module/process 915 to estimate the location and orientation of a "target" object, such as a pallet or tray to which items present in the workspace are to be moved.

In the example shown in FIG. 9A, segmentation processing 916, 922 is performed on RGB data from the sensor nodes 902, 904 and the respective segmentation results are used to perform "box fit" processing 918, 924 to determine bounding boxes (or other polyhedrons) for object instances identified in the RGB segmentation. The box fit results 918, 924 are merged 925 and used to perform stable object matching 926, the result of which is used to perform grasp synthesis 927 and to generate and display visualization 928 of the workspace.

While in the example shown in FIG. 9A only RGB segmentation information is merged 925 and used to perform stable object matching 926, perform grasp synthesis 927, and generate visualization 928 of objects in the workspace, in some alternative embodiments the result of merging the point cloud data 910 and subsampling 912 and identifying object clusters 914 based on the merged point cloud data may be merged 925 together with the results of RGB segmentation and box fit (916, 918, 922, 924) to perform stable object matching 926, perform grasp synthesis 927, and generate visualization 928 of objects in the workspace.

In various embodiments, the pipeline may be defined in advance and/or may be adapted dynamically, in real time, based on conditions. For example, if objects in the workspace are significantly cluttered, the RGB segmentation results may be a better signal than the 3D clustering process, and in some embodiments under such condition the box (polygon) fit may be applied just on the RGB segmentation output. In other conditions, both sources of segmentation (RGB, point cloud data) may be applied when doing the geometric primitive fit, etc.

While in the example shown in FIG. 9A the "box fit" results 918, 924 based on RGB segmentation 916, 922 data from all sensors (e.g., cameras) 902, 904 are merged 925 and used to perform downstream tasks, such as stable object matching 926, grasp synthesis 927, and visualization 928, in various embodiments RGB segmentation and/or box fit data from fewer than all sensors may be merged and used to perform one or more of the downstream tasks. In some embodiments, a determination may be made dynamically that the quality and/or content of data from a given sensor is not reliable and/or as helpful as data from other sensors to perform a given downstream task, and data from that sensor may be omitted (i.e., discarded and not used) in performing that task.

In some embodiments, a pipeline may be defined to omit a given sensor from a given pipeline path and/or task. For example, a user defining the pipeline as disclosed herein may decide based on the capabilities, quality, reliability, and/or position of a sensor that the sensor may be useful for some tasks but not others, and may define the pipeline to use the output of that sensor only for those tasks for which that sensor is considered suitable and/or useful.

In various embodiments, a pipeline such as pipeline 900 of FIG. 9A may be modified at any time, e.g., to modify how certain sensors are used and/or to add or remove sensors to the set of sensors 902, 904. In various embodiments, a new or updated pipeline is defined, and code to implement the pipeline is generated and deployed as disclosed herein, enable the new pipeline, added sensor, etc. to be deployed and used to perform subsequent robotic operations.

FIG. 9B is a diagram illustrating an embodiment of a multi-camera image processing system for robotic control. In the example processing pipeline 940 shown in FIG. 9B, the output of the sensors 902, 904, e.g., camera frame data, is processed by workspace filters 906, 908 to generate filtered sensor output the 3D point cloud data portions of which are merged 910 to generate merged point cloud data for the workspace. The merged point cloud data in this example is provided to three separate modules, a pre-visualization module 942, which performs processing to enhance the information present in the merged point cloud data; a "voxel" processing module 944, which identifies 3D spaces that are and/or are not occupied by an object of interest in the workspace; and a visualization module 946, which generates and provides a visualization, e.g., via a display device, based on the merged point cloud data and the output of the pre-visualization 942 and voxel 944 modules. In various embodiments, the pre-visualization module 942 reformats data from the rest of the processing pipeline to allow efficient rendering, enabling a highly interactive visualization where users can pan, zoom, rotate, etc. smoothly.

FIG. 9C is a diagram illustrating an embodiment of a multi-camera image processing system for robotic control. In the example shown, pipeline 960 includes a single sensor node 962 the output (e.g., 3D or other camera frame data) of which is processed by a workspace filter 964 to provide filtered data to a clustering module or process 966, a pre-visualization module 970, and a visualization module 972. In addition, the output of clustering module 966 is provided to visualization module 972 and to grasp synthesis module 968, the output of which is provided in turn to pre-visualization module 970 and visualization module 972. The example shown in FIG. 9C illustrates how readily modules can be linked together to define a processing pipeline, as disclosed herein, with the output of intermediate modules being propagated along multiple paths to ensure each processing module has the information needed to provide the best information as output to subsequent modules in the pipeline. In the example shown in FIG. 9C, for example, the visualization module has access to raw filtered sensor node output, via sensor 962 and workspace filter 964, as well as cluster information 966, grasp synthesis data 968, and pre-visualization results 970 generated based on workspace filtered sensor output 962, 964 and grasp synthesis results 968, enabling a high quality visualization enriched with information that may be very useful to a human operator in monitoring and/or intervening in (e.g., via teleoperation) a robotic operation.

Figure 10:
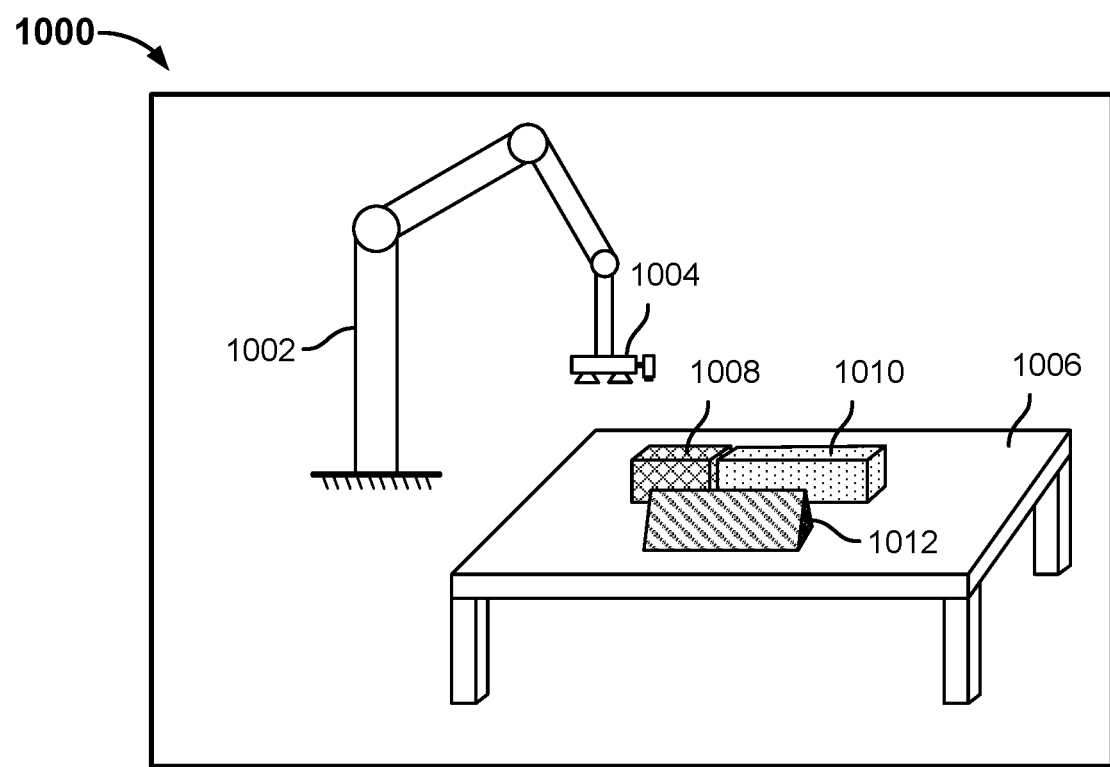
FIG. 10 is a diagram illustrating an example of a visual display generated and provided in an embodiment of a multi-camera image processing system.

FIG. 10 is a diagram illustrating an example of a visual display generated and provided in an embodiment of a multi-camera image processing system. In various embodiments, the display 1000 may be generated and displayed based on image data from multiple cameras in a workspace as disclosed herein, e.g., by the processes and systems illustrated in FIGS. 8 and 9. In the example shown, the display 1000 shows a workspace (or portion thereof) that includes a robotic arm 1002 with a suction cup style end effector 1004 that has a camera mounted on it (to right side as shown). The robotic system in this example may be configured to retrieve items from the table 1006 and move them to a destination location, e.g., to a pallet or other destination not shown in FIG. 10. The objects 1008, 1010, and 1012 shown on table 1006 each have been identified as an object instance and the fill patterns as shown represent different colors used to highlight the objects and distinguish between them. In various embodiments, the display 1000 may be provided to enable a human operator to detect errors in the segmentation of objects to be operated on by the robotic system, e.g., if two adjacent objects are shown within a single color and/or bounding box (or other shape) and/or to control the robotic arm 1002 by teleoperation.

Figure 11:
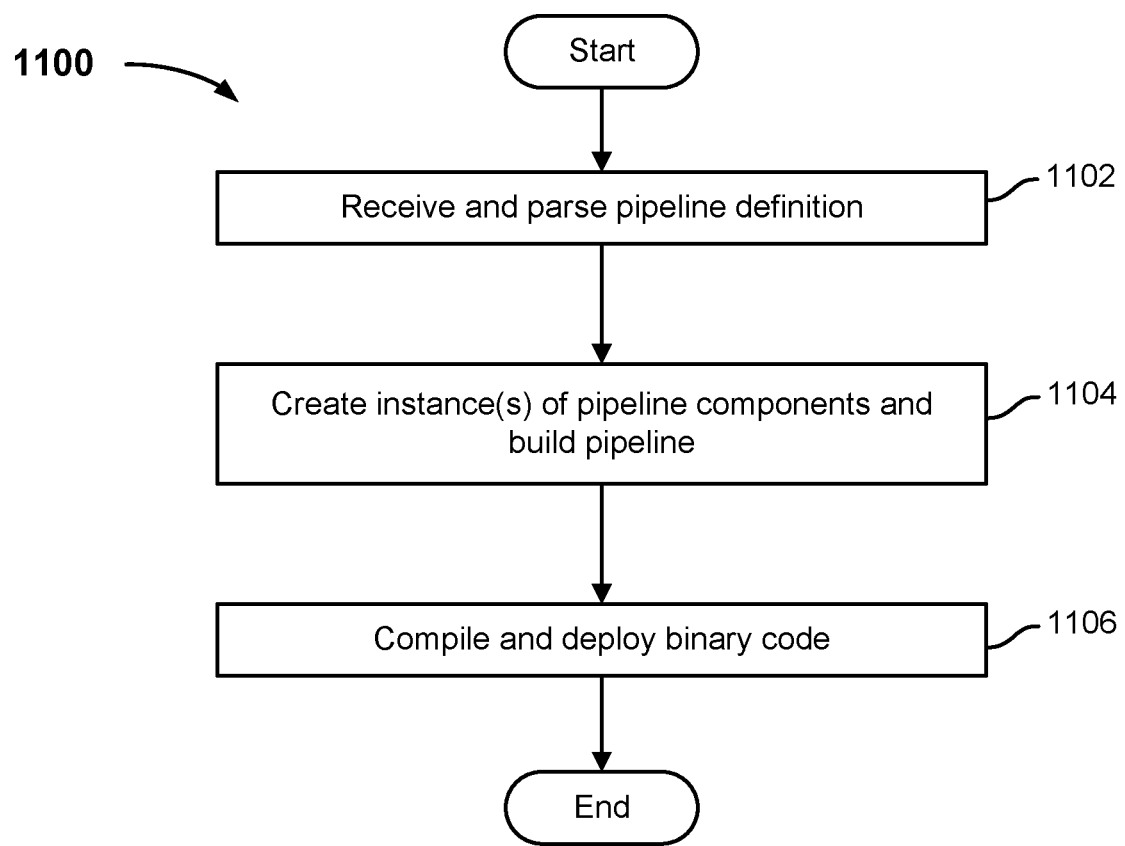
FIG. 11 is a flow diagram illustrating an embodiment of a process to generate code to process sensor data in a multi-camera image processing system for robotic control.

FIG. 11 is a flow diagram illustrating an embodiment of a process to generate code to process sensor data in a multi-camera image processing system for robotic control. In various embodiments, process 1100 is performed by a computer, such as control computer 118 of FIG. 1. In the example shown, a pipeline definition is received and parsed (1102). For example, a pipeline definition may be received via a user interface, a configuration file, an API, etc. Instances of processing components to be included in the processing pipeline, as defined, are created and linked together as defined in the pipeline definition (1104). Binary code to implement the components and pipeline is compiled (if necessary) and deployed (1106).

In various embodiments, techniques disclosed herein may be used to perform robotic operations, fully or partly autonomously and/or via fully or partly teleoperation, based on image data generated by multiple cameras in a workspace, including in some embodiments one or more cameras mounted on a robotic arm or other robotic actuator.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface configured to receive image data from each of a plurality of sensors associated with a workspace wherein the image data comprises for each sensor in the plurality of sensors one or both of visual image information and depth information, and the plurality of image sensors comprises a plurality of cameras; and
   a processor coupled to the communication interface and configured to:
   merge image data from the plurality of sensors to generate a merged point cloud data;
   perform segmentation based on visual image data from a subset of the sensors in the plurality of sensors to generate a segmentation result, wherein:
   the segmentation result is obtained based on performing segmentation using RGB data from a camera;
   the segmentation result comprises a plurality of RGB pixels; and
   a subset of the plurality of RGB pixels is identified based at least in part on determination that the corresponding RGB pixels are associated with an object boundary;
   use one or both of the merged point cloud data and the segmentation result to generate a merged three dimensional and segmented view of the workspace, including by:
   mapping RGB pixels identified in the segmentation result to corresponding depth pixels to obtain mapped depth pixel information;
   using the segmentation result and the mapped depth pixel information to de-project to a point cloud with segmented shapes around points for each object;
   for each of the plurality of cameras, labelling the point cloud generated by that camera for each object and computing a corresponding centroid; and using nearest neighbor computations between centroids of corresponding object point clouds of the plurality of cameras to segment objects within the workspace; and use one or both of the merged point cloud data and the segmentation result to determine a strategy to grasp an object present in the workspace using a robotic arm.

2. The system of claim 1, wherein the plurality of image sensors includes one or more three dimensional (3D) cameras.

3. The system of claim 1, wherein the visual image data includes RGB data.

4. The system of claim 1, wherein the processor is configured to use one or both of the merged point cloud data and the segmentation result to perform a box fit with respect to the object in the workspace.

5. The system of claim 1, wherein the processor is further configured to implement the strategy to grasp the object using the robotic arm.

6. The system of claim 5, wherein the processor is configured to grasp the object in connection with a robotic operation to pick the object from an origin location and place the object in a destination location in the workspace.

7. The system of claim 1, wherein the processor is further configured to use the merged three dimensional and segmented view of the workspace to display a visualization of the workspace.

8. The system of claim 7, wherein the displayed visualization highlights the object as depicted within the workspace.

9. The system of claim 1, wherein the processor is configured to use the merged point cloud data and the segmentation result to generate a merged three dimensional and segmented view of the workspace at least in part by de-projecting into the merged point cloud a set of points comprising the segmentation result.

10. The system of claim 1, wherein the processor is further configured to subsample the merged point cloud data.

11. The system of claim 10, wherein the processor is further configured to perform cluster processing on the subsampled point cloud data.

12. The system of claim 11, wherein the processor is configured to use the subsampled and clustered point cloud data and the segmentation result to generate a box fit result with respect to the object in the workspace.

13. The system of claim 1, wherein the processor is further configured to validate the merged three dimensional and segmented view of the workspace based at least in part on visual image data associated with a sensor not included in the subset of sensors.

14. The system of claim 13, wherein the processor is configured to validate the merged three dimensional and segmented view of the workspace based at least in part on visual image data associated with a sensor not included in the subset of sensors at least in part by using the merged three dimensional and segmented view of the workspace to generate a first box fit result with respect to an object in the workspace; using the visual image data associated with the sensor not included in the subset of sensors to generate a second box fit result with respect to the object in the workspace; and using the first box fit and the second box fit to determine a validated box fit for the object.

15. The system of claim 1, wherein the processor is configured to merge and process the image data at least in part by implementing a user-defined processing pipeline.

16. The system of claim 15, wherein the processor is configured to receive and parse a definition of the user-defined processing pipeline.

17. The system of claim 16, wherein the processor is configured to use the definition to create instances of modules comprising the pipeline and to auto-generate binary code to implement the modules and pipeline.

18. The system of claim 1, wherein the merged three dimensional and segmented view of the workspace comprises:
an indication of one or more three dimensional spaces that are not occupied within the workspace;
an indication of one or more items in the workspace, including the object to be grasped; and
one or more obstacles in the workspace.

19. The system of claim 18, wherein one or both of the merged point cloud data and the segmentation result is used to determine a trajectory via which the robotic arm is to move the object to a destination location.

20. A method, comprising:
receiving image data from each of a plurality of sensors associated with a workspace, the image data comprising for each sensor in the plurality of sensors one or both of visual image information and depth information;
merging image data from the plurality of sensors to generate a merged point cloud data;
performing segmentation based on visual image data from a subset of the sensors in the plurality of sensors to generate a segmentation result, wherein:
the segmentation result is obtained based on performing segmentation using RGB data from a camera;
the segmentation result comprises a plurality of RGB pixels; and
a subset of the plurality of RGB pixels is identified based at least in part on determination that the corresponding RGB pixels are associated with an object boundary;
using one or both of the merged point cloud data and the segmentation result to generate a merged three dimensional and segmented view of the workspace, including by:
mapping RGB pixels identified in the segmentation result to corresponding depth pixels to obtain mapped depth pixel information;
using the segmentation result and the mapped depth pixel information to de-project to a point cloud with segmented shapes around points for each object;
for each of the plurality of cameras, labelling the point cloud generated by that camera for each object and computing a corresponding centroid; and
using nearest neighbor computations between centroids of corresponding object point clouds of the plurality of cameras to segment objects within the workspace; and
using one or both of the merged point cloud data and the segmentation result to determine a strategy to grasp an object present in the workspace using a robotic arm.

21. A computer program product embodied in a non-transitory computer readable medium and comprising computer instructions for:
receiving image data from each of a plurality of sensors associated with a workspace, the image data comprising for each sensor in the plurality of sensors one or both of visual image information and depth information;

merging image data from the plurality of sensors to generate a merged point cloud data;
performing segmentation based on visual image data from a subset of the sensors in the plurality of sensors to generate a segmentation result, wherein:
   the segmentation result is obtained based on performing segmentation using RGB data from a camera;
   the segmentation result comprises a plurality of RGB pixels; and
   a subset of the plurality of RGB pixels is identified based at least in part on determination that the corresponding RGB pixels are associated with an object boundary;
using one or both of the merged point cloud data and the segmentation result to generate a merged three dimensional and segmented view of the workspace, including by:
   mapping RGB pixels identified in the segmentation result to corresponding depth pixels to obtain mapped depth pixel information;
   using the segmentation result and the mapped depth pixel information to de-project to a point cloud with segmented shapes around points for each object;
   for each of the plurality of cameras, labelling the point cloud generated by that camera for each object and computing a corresponding centroid; and
   using nearest neighbor computations between centroids of corresponding object point clouds of the plurality of cameras to segment objects within the workspace; and
using one or both of the merged point cloud data and the segmentation result to determine a strategy to grasp an object present in the workspace using a robotic arm.

* * * * *